(12) United States Patent
Bonner

(10) Patent No.: US 10,167,168 B1
(45) Date of Patent: Jan. 1, 2019

(54) CASTING REEL SUPPORTING DEVICE

(71) Applicant: Darrell Bonner, Paragould, AR (US)

(72) Inventor: Darrell Bonner, Paragould, AR (US)

( * ) Notice: Subject to any disclaimer, the term of this patent is extended or adjusted under 35 U.S.C. 154(b) by 0 days.

(21) Appl. No.: 15/795,417

(22) Filed: Oct. 27, 2017

(51) Int. Cl.
*B65H 49/32* (2006.01)
*B65H 59/04* (2006.01)
*A01K 89/00* (2006.01)

(52) U.S. Cl.
CPC .......... *B65H 59/04* (2013.01); *A01K 89/003* (2013.01); *B65H 49/325* (2013.01); *B65H 2701/355* (2013.01)

(58) Field of Classification Search
CPC B65H 59/04; B65H 49/325; B65H 2701/355; A01K 89/003
See application file for complete search history.

(56) References Cited

U.S. PATENT DOCUMENTS

| | | | | |
|---|---|---|---|---|
| 1,557,887 | A * | 10/1925 | Sheeley | B65H 49/32 242/423.1 |
| 1,961,176 | A * | 6/1934 | Smith | B29C 43/22 242/591 |
| 2,396,805 | A * | 3/1946 | Schwartz | B65H 35/0006 242/423.1 |
| 3,171,610 | A * | 3/1965 | Hoch | B65H 49/305 242/128 |
| 3,638,878 | A | 2/1972 | Monis | |
| 4,190,211 | A * | 2/1980 | Janzen | B65H 49/32 242/423.1 |
| 4,360,172 | A * | 11/1982 | Cope | A01K 89/003 242/134 |
| 4,494,710 | A * | 1/1985 | Harris | B65H 59/04 188/166 |
| 5,322,236 | A * | 6/1994 | Smith | A01K 89/003 118/420 |
| 5,551,645 | A | 9/1996 | Torvund | |
| 5,709,350 | A * | 1/1998 | Davis | A01K 89/003 242/390.8 |
| 6,224,011 | B1 | 5/2001 | Gavaza, III | |
| 6,629,658 | B2 | 10/2003 | Lu | |
| 6,651,919 | B2 | 11/2003 | Wethington | |
| 6,739,542 | B1 | 5/2004 | Prina | |
| 2012/0205481 | A1* | 8/2012 | Stout | B65H 49/32 242/423.1 |
| 2017/0064933 | A1* | 3/2017 | Tseng | A01K 89/003 |

* cited by examiner

*Primary Examiner* — William A. Rivera
(74) *Attorney, Agent, or Firm* — Cramer Patent & Design, PLLC; Aaron R. Cramer

(57) ABSTRACT

A casting reel spooling device includes a base having an upright support arm perpendicularly secured adjacent a first base end. A pair of spool arms are each secured to the support arm and project out over the base. Each spool arm has a spring positioned between a plurality of moveable fishing spool support tumblers. The device is configured to support a plurality of fishing line spools which facilitate fishing line from an individual fishing line spool to be reeled into a given fishing reel into which the respective fishing line is secured.

18 Claims, 4 Drawing Sheets

CASTING REEL SUPPORTING DEVICE

RELATED APPLICATIONS

Not applicable.

FIELD OF THE INVENTION

The present invention relates to a device for supporting a plurality of casting reels.

BACKGROUND OF THE INVENTION

The technology used by anglers to catch fish has become increasingly complex in nature. Fishermen no longer rely on the traditional hook and worm approach to attract their game. Instead, a broad range of products have hit the market, designed to aid the fisherman to catch more fish quickly. As would be suspected, the fishing rod is still a very important part of fishing. And as most mechanical things, it is prone to wearing out and failing, especially the fishing line.

When a line requires replacement, it is typically a two-person operation, one (1) to hold the reel of new line, and one (1) to wind it up on the new reel. Even so, the reel of new line is prone to slipping and misalignment. It is also difficult to keep the proper tensions. Should the user attempt to perform the operation by themselves, the line is usually taken off of the side of the new reel, thus imparting a twist to the line, leading to unsatisfactory performance of the fishing reel and rod set. Accordingly, there exists a need for a means by which a new fishing line can be easily transferred to an empty fishing rod reel without the problems as described above. The development of the casting reel spooling device fulfills this need.

SUMMARY OF THE INVENTION

The principles of the present invention provide for a device that enables such threading of replacement line onto a fishing line spool reel without the encumbrance of multiple moving parts, mis-threading or introducing an unwanted twist in the line, or use of multiple individuals.

Therefore, an object of the present invention is to provide a device that enables restrictive rotation of a fishing line spool reel on a study base that prevents the aforementioned problems. Such a device would be even more beneficial if it is capable of supporting multiple fishing line spool reels therein, so that a new reel can be staged for receiving new fishing line when necessary.

In one (1) embodiment, the device includes a base that supports a vertical support arm and a pair of horizontal support arms, each parallel to each other, and supported on the vertical support arm. The horizontal support arm may or may not be secured with a pair of securement fasteners and a pair of washers. Each horizontal support arm includes a plurality of spool sleeves, each disposed on and capable of traversing along the respective horizontal support arm, a plurality of pairs of flanged friction fittings bracketing an individual spool sleeve, each pair capable of traversing along the respective horizontal support arm, a compression spring disposed on the respective horizontal support arm between the vertical support arm and a flanged friction fitting most adjacent to the vertical support arm, and a locking collar removably secured to the respective horizontal support arm. Each of the plurality of spool sleeves and is capable of supporting a fishing line spool reel thereupon. The plurality of spool sleeves and pairs of flanged friction fittings are capable of free rotation about the respective horizontal support arm. The locking collar provides a restrictive force against rotation of and the first compression spring provides continuous tension to each fishing line spool reel when installed on the respective horizontal support arm.

In certain embodiment, the device includes an anti-corrosion and water proof finish. In certain embodiments, it is preferred that the base is fabricated with steel channel stock, the vertical support arm is fabricated out of steel strap stock, and each horizontal support arm is fabricated out of steel rod.

A further embodiment includes at least one (1) anti-skid bumper strip bonded to a single bottom surface of said base. Preferably, the device enjoys two (2) anti-skid bumper strips bonded to both bottom surfaces of said base.

It is a further embodiment of the device to have a least a portion of each horizontal support arm to protrude through the vertical support arm. In other embodiments, each horizontal support arm is capable of supporting up to four (4) fishing line spool reels thereupon.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
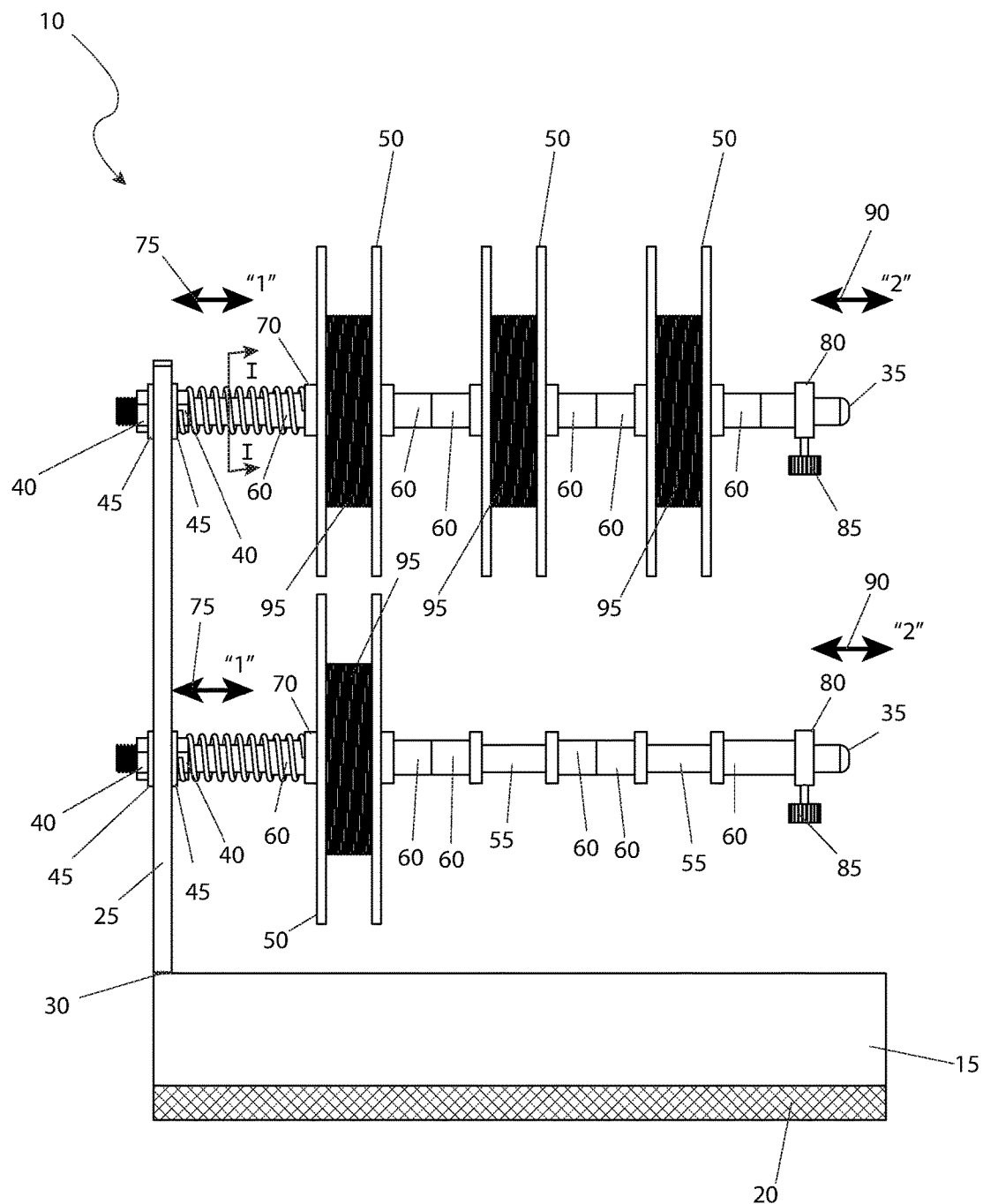
FIG. 1 is a front view of the casting reel spooling device 10, according to the preferred embodiment of the present invention.

10 casting reel spooling device
15 base
20 anti-skid protective bumper strip
25 vertical support arm
30 connection means
35 horizontal support arm
40 connection nuts
45 connection washer
50 fishing line spool reel
55 spool sleeve
60 flanged friction fitting
65 highly compressible spring
70 outer bearing face
75 first travel path "1"
80 locking collar
85 thumbscrew
90 second travel path "2"
95 new fishing line
100 inner bushing side surface
105 work surface
110 fishing pole
115 user 120 fishing reel

DETAILED DESCRIPTION OF THE PREFERRED EMBODIMENT

Figure 2:
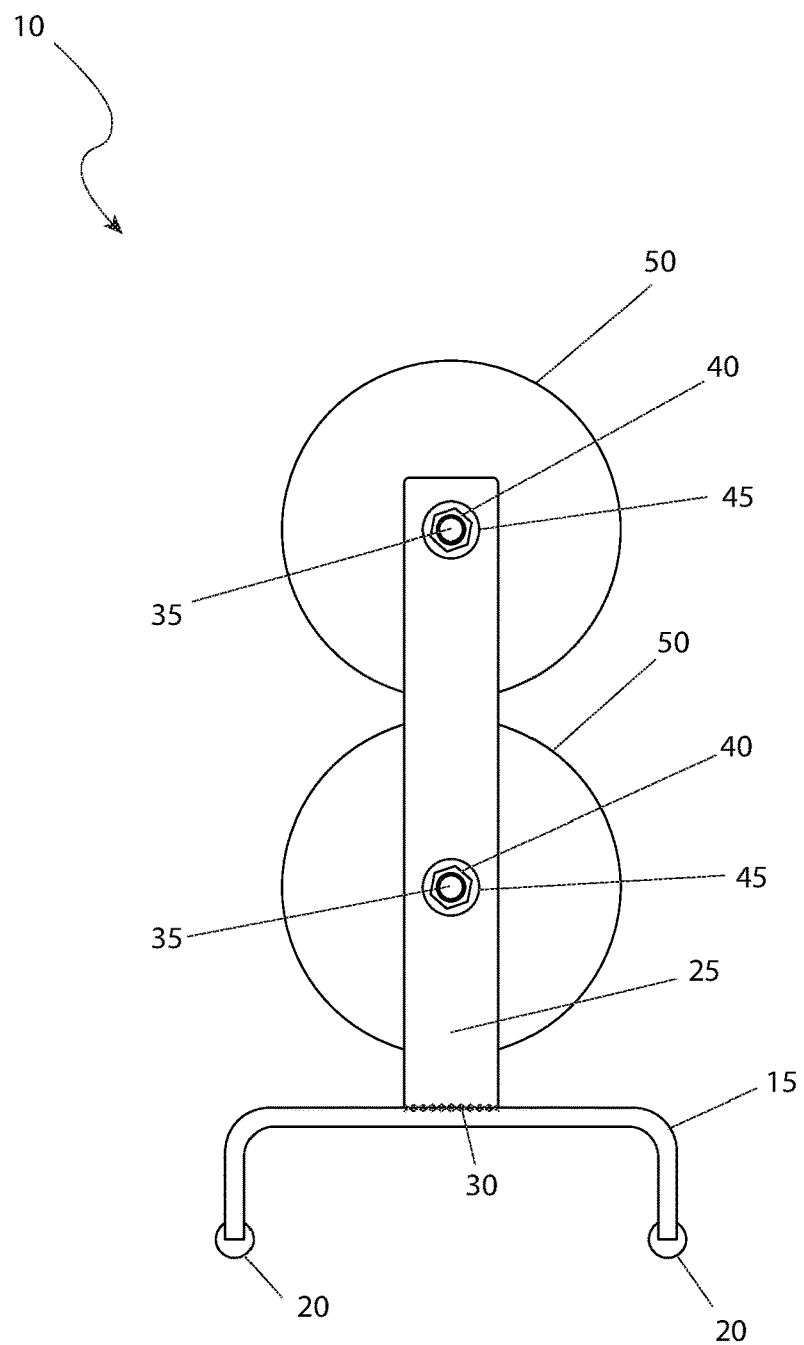
FIG. 2 is a side view of the casting reel spooling device 10, according to the preferred embodiment of the present invention.
Figure 3:
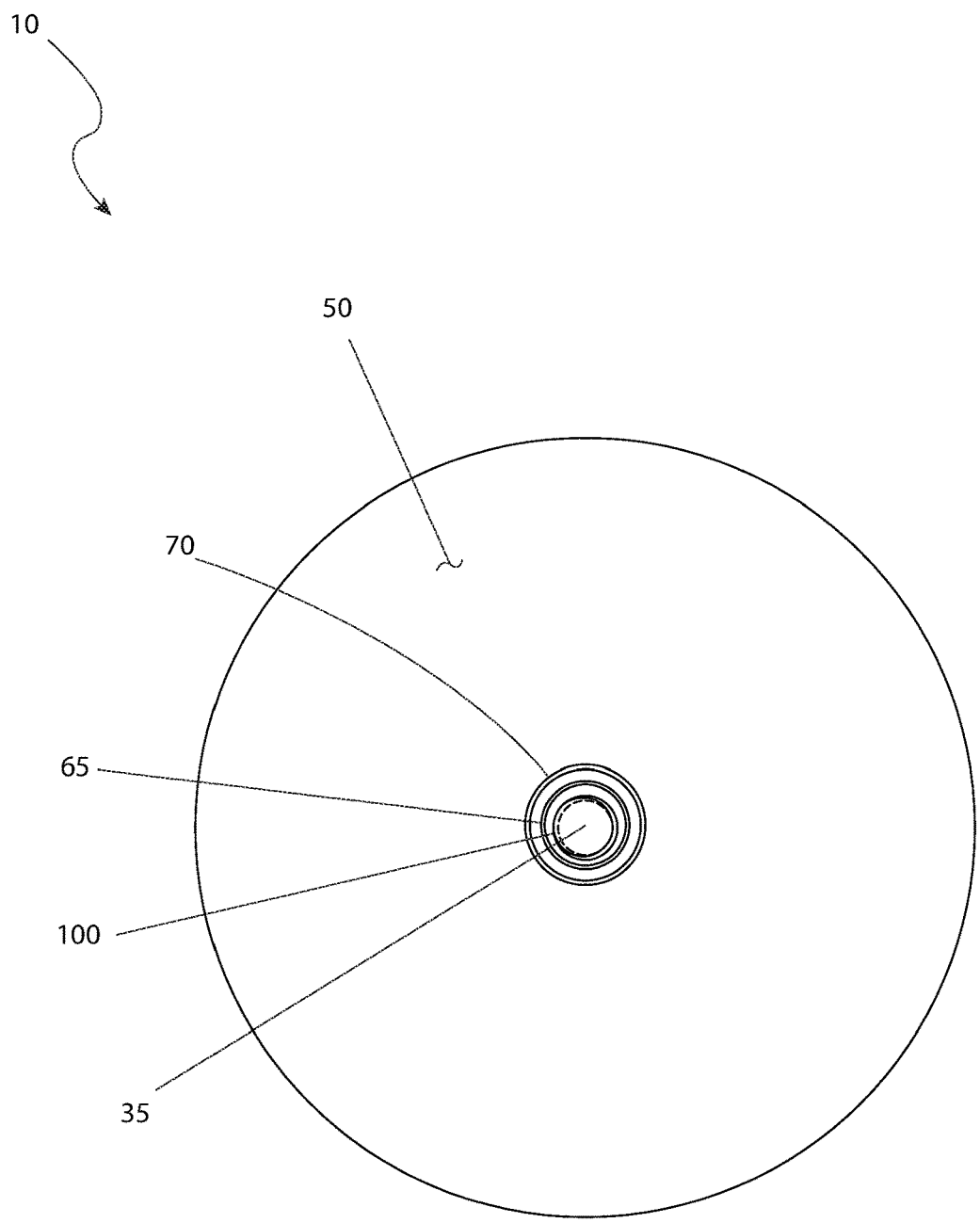
FIG. 3 is a sectional view of the casting reel spooling device 10, shown along a line I-I, as shown in FIG. 1, according to the preferred embodiment of the present invention; and, FIG. 4 is a perspective view of the casting reel spooling device 10, shown in a utilized state, according to the preferred embodiment of the present invention.

The best mode for carrying out the invention is presented in terms of its preferred embodiment, herein depicted within FIGS. 1 through 3. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

Referring now to FIG. 1, a front view of the casting reel spooling device 10, according to the preferred embodiment of the present invention is disclosed. The casting reel spooling device 10 (herein also described as the "device") 10, includes a heavy base 15, envisioned to be manufactured from a section of steel channel stock, and is generally "U"-shaped. The base 15 provides resistant against movement of the device 10 during use with at least one (1) anti-skid bumper strip 20 bonded to one (1) of the bottom surfaces of the base 15. Preferably, two (2) anti-skid protective bumper strips 20 (only one (1) of which is shown due to illustrative limitations) are located on the two (2) bottom surfaces of the base 15. The anti-skid protective bumper strips 20 provides protection against damage to any surface the device 10 is set upon as well as providing an increased coefficient of friction to further aid in resistance to movement. A vertical support arm 25 is provided on one (1) side of the base 15, envisioned to be manufactured from a steel strap stock, which is attached by a connection means 30 such as welding. A set of two (2) horizontal support arms 35, made of circular steel rod and threaded at the proximal end, are attached to the vertical support arm 25 by use of two (2) connection nuts 40 and two (2) connection washer 45 on each support arm 35, with a set on either side of the vertical support arm 25 as expected in the customary manner. Up to eight (8) fishing line spool reels 50 are capable of being placed upon the device 10 with up to four (4) fishing line spool reels 50 on the upper horizontal support arms 35 and up to four (4) fishing line spool reels 50 on the lower horizontal support arms 35. Note that the present figure shows only one (1) on the lower horizontal support arms 35 for purposes of clarification and illustration. Also note that three (3) fishing line spool reels 50 are illustrated here on the upper and lower horizontal support arms 35, for ease of viewing features.

Each of the fishing line spool reels 50 are mounted upon spool sleeves 55 to accommodate for any differences in the inner diameter opening on the fishing line spool reels 50 and the outer diameter of the horizontal support arms 35. Two (2) of the spool sleeves 55 are visible in FIG. 1, with the remaining four (4) being hidden by the four (4) shown fishing line spool reels 50. Each spool sleeve 55 is bordered on each side by a flanged friction fitting 60 for a total of twelve (12). It is noted that the spool sleeves 55 and the flanged friction fittings 60 are free to rotate and slide along the horizontal support arms 35. A highly compressible spring 65 is provided along each horizontal support arms 35 which bears upon the inner connection washer 45 and the outer bearing face 70 of the innermost flanged friction fitting 60. As elements on each horizontal support arms 35 are moved the highly compressible spring 65 moves back and forth along a first travel path "1" 75.

A locking collar 80 is provided on the distal end of each horizontal support arms 35. Each locking collar 80 is provided with a thumbscrew 85 that locks the locking collar 80 at a selectable point along each horizontal support arms 35. The range of travel motion afforded by the locking collar 80 is indicated by a second travel path "2" 90. As such, by manipulation of the locking collar 80 against the resistance of the highly compressible spring 65, a determined resistance to turning motion is imposed on all elements suspended on the horizontal support arms 35. Such resistance allows the fishing line spool reels 50 to rotate to allow for the distribution of supplied new fishing line 95, but does not allow for rapid uncontrolled rotation that provided unwanted unspooled new fishing line 95 which can become tangled. Additionally, the resistance to motion of the new fishing line 95 as provided by the device 10 ensures that the new fishing line 95 is properly installed on the new fishing pole reel (not shown) to allow for easy future usage. The device 10 provides storage for up to eight (8) fishing line spool reels 50 as shown. However, the teachings can be expanded to fewer or more fishing line spool reels 50, and as such the exact quantity as used by the device 10, should not be interpreted as a limiting factor of the present invention. The device 10 provides for storage and transport of fishing line spool reels 50 when not being utilized, ensuring that adequate fishing line for multiple poles, multiple people and for multiple days can be easily provided.

Referring next to FIG. 2, a side view of the device 10, according to the preferred embodiment of the present invention is depicted. This figure provides for a clearer definition of the arrangement between the base 15 and the vertical support arm 25 and the connection means 30 between them. Both anti-skid protective bumper strips 20 are visible from their end view as well. The horizontal support arms 35 protrudes through the vertical support arm 25 and are visible along their axial end. The retention of the horizontal support arms 35 to the vertical support arm 25 is performed by firm tightening of the connection nuts 40 against the connection washer 45 on each horizontal support arms 35. The fishing line spool reels 50 are then visible behind the vertical support arm 25. It should be noted that most common sizes of fishing line spool reels 50 are accommodated by the device 10. Should extremely large reels be encountered, they would be placed on the upper horizontal support arms 35 with no corresponding reel placed underneath to accommodate the larger diameter. Should fishing line spool reels 50 that are even larger be encountered, they would still be placed on the upper horizontal support arms 35 with the lower horizontal support arms 35 being totally removed by disengagement of the connection nuts 40 and connection washer 45 as shown. As the base 15 and vertical support arm 25 are envisioned to be manufactured from steel, a protective coating such as paint or plating would be applied to prevent corrosion as would be likely be encountered in a near water environment such as while fishing.

Referring now to FIG. 3, a sectional view of the device 10, shown along a line I-I, as shown in FIG. 1, according to the preferred embodiment of the present invention is shown. The center of the device 10 is occupied by the horizontal support arms 35 thus forming the structural support providing stability for the device 10. The inner bushing side surface 100 of the flanged friction fitting 60 is visible as is the outer bearing face 70 of the flanged friction fitting 60. The highly compressible spring 65 is then visible as contacting the outer bearing face 70 as aforementioned described in FIG. 1. The fishing line spool reels 50, which varies in diameter dependent on the manufacturer of the fishing line spool reels 50 utilized, is then visible in the far field.

Figure 4:
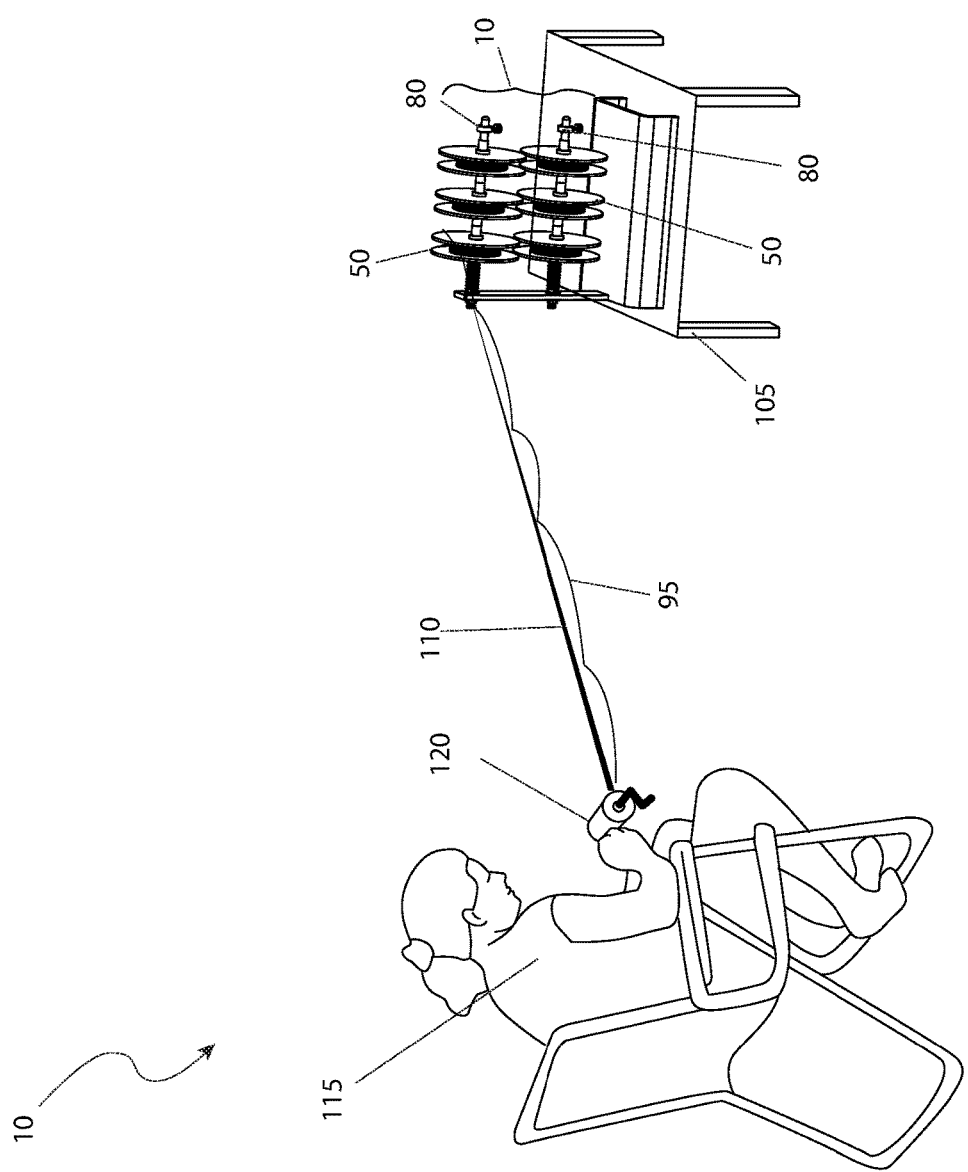

Referring finally to FIG. 4, a perspective view of the device 10, shown in a utilized state, according to the preferred embodiment of the present invention is disclosed. The device 10 is placed upon a work surface 105 such as table, workbench, cooler, pickup truck tailgate or the like. The new fishing line 95 is threaded off of one (1) of spool sleeves 55 and onto an inner bushing side surface 100. A user 115 then begins the process of winding the new fishing line 95 onto a fishing reel 120. As the process continues, adjustments to the locking collar 80 can be made by moving it along the second travel path "2" 90 (as shown in FIG. 1). Inward adjustment (towards the vertical support arm 25 (as shown in FIG. 1)) increases resistance and thus increases tautness of the new fishing line 95. Outward adjustment (away from the vertical support arm 25 (as shown in FIG. 1)) reduces tautness of the new fishing line 95. Once an appropriate quantity of new fishing line 95 is applied to the fishing reel 120, the new fishing line 95 is cut and terminated in the conventional manner. The process can be quickly repeated using other fishing line spool reels 50 as previously mounted on the device 10. This operation can be accomplished by only one (1) person or user 115. This is due to two (2) factors. First, the device 10 is heavy enough not be dislodged or displaced during use or tension applied through the spool sleeves 55. Second, the device 10 is capable of applying adjustable and continuous tension to the fishing line spool reels 50 through use of the highly compressible spring 65 (as shown in FIG. 1).

The preferred embodiment of the present invention can be utilized by the common user in a simple and effortless manner with little or no training. It is envisioned that the casting reel spooling device 10 would be constructed in general accordance with FIG. 1 through FIG. 3. The user would procure the casting reel spooling device 10 through normal procurement channels. It would consist of all components shown in FIG. 1 with the exception of the fishing line spool reels 50 and associated new fishing line 95.

After procurement and prior to utilization, the casting reel spooling device 10 would be prepared in the following manner: remove the locking collar 80 via manipulation of the thumbscrew 85, slide all spool sleeves 55 and flanged friction fitting 60 off except for the last one nearest the vertical support arm 25 which engages the highly compressible spring 65, slide on desired amount of fishing line spool reels 50 using any spool sleeves 55 as necessary, slide on opposing flanged friction fitting 60 on distal side of fishing line spool reels 50, repeat process with desired number of fishing line spool reels 50 (up to three (3) per horizontal support arms 35), preliminary adjust tension of resistance to rotation of the fishing line spool reels 50 by manipulation of the locking collar 80 and thumbscrew 85. At this point in time, the device 10 is ready for storage, transport and subsequent utilization.

During utilization of the device 10, the following procedure would be initiated; placement of the device 10 on a suitable work surface 105, the new fishing line 95 is threaded off of one (1) of spool sleeves 55 and onto an inner bushing side surface 100, a user 115 then begins the process of winding the new fishing line 95 onto a fishing reel 120, as the process continues, adjustments to the locking collar 80 can be made by moving it along the second travel path "2" 90, inward adjustment (towards the vertical support arm 25) increases resistance and thus increases tautness of the new fishing line 95, outward adjustment (away from the vertical support arm 25) reduces tautness of the new fishing line 95. Once an appropriate quantity of new fishing line 95 is applied to the fishing reel 120, the new fishing line 95 is cut and terminated in the conventional manner. This process can be quickly repeated using other fishing line spool reels 50 as previously mounted on the device 10.

The process can continue in a cyclical manner using additional quantities of fishing reel 120 needing replenishment of new fishing line 95 and/or periodic replacement of depleted fishing line spool reels 50 upon the device 10.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A casting reel spooling device, comprising:
   a base;
   a vertical support arm affixed to and extending away from an upper side of said base;
   a first horizontal support arm, having a first end removably secured to said vertical support arm;
   a second horizontal support arm, having a first end removably secured to said vertical support arm;
   a first plurality of spool sleeves, each disposed on and capable of traversing along said first horizontal support arm;
   a plurality of first pairs of flanged friction fittings bracketing an individual one of said first plurality of spool sleeves, each first pair of flanged friction fittings capable of traversing along said first horizontal support arm;
   a first compression spring disposed on said first horizontal support arm between said vertical support arm and a flanged friction fitting from said first pair of flanged friction fittings most adjacent to said vertical support arm;
   a first locking collar removably secured to said first horizontal support arm;
   a second plurality of spool sleeves, each disposed on and capable of traversing along said second horizontal support arm;
   a plurality of second pairs of flanged friction fittings bracketing an individual one of said second plurality of spool sleeves, each second pair of flanged friction fittings capable of traversing along said second horizontal support arm;
   a second compression spring disposed on said second horizontal support arm between said vertical support arm and a flanged friction fitting from said second pair of flanged friction fittings most adjacent to said vertical support arm; and,
a second locking collar removably secured to said secured horizontal support arm;
wherein said first and second horizontal support arms are disposed parallel to each other;
wherein each of said first plurality of spool sleeves and each of said plurality of second support sleeves is capable of supporting a fishing line spool reel thereupon;
wherein each of said first plurality of spool sleeves and each of said plurality of first pairs of flanged friction fittings are capable of free rotation about said first horizontal support arm;
wherein said first locking collar provides a restrictive force against rotation of and said first compression spring provides continuous tension to each fishing line spool reel when installed on said first horizontal support arm;
wherein each of said second plurality of spool sleeves and each of said plurality of second pairs of flanged friction fittings are capable of free rotation about said second horizontal support arm; and,
wherein said second locking collar provides a restrictive force against rotation of and said second compression spring provides continuous tension to each fishing line spool reel when installed on said second horizontal support arm.

2. The device of claim 1, wherein said base is fabricated with steel channel stock.

3. The device of claim 1, further comprising at least one anti-skid bumper strip bonded to a single bottom surface of said base.

4. The device of claim 3, further comprising two anti-skid bumper strips bonded to both bottom surfaces of said base.

5. The device of claim 1, wherein said vertical support arm is fabricated out of steel strap stock.

6. The device of claim 1, wherein said first and second horizontal support arms are fabricated out of steel rods.

7. The device of claim 1, wherein said first horizontal support arm and said second horizontal support arm are each configured to support up to four fishing line spool reels thereupon.

8. The device of claim 1, wherein:
at least a portion of said first horizontal support arm protrudes through said vertical support arm; and,
at least a portion of said second horizontal support arm protrudes through said vertical support arm.

9. The device of claim 1, further comprising an anti-corrosion and water-proof finish.

10. The device of claim 1, further comprising at least one anti-skid bumper strip bonded to a single bottom surface of said base.

11. The device of claim 10, further comprising two anti-skid bumper strips bonded to both bottom surfaces of said base.

12. A casting reel spooling device, comprising:
a base;
a vertical support arm affixed to and extending away from an upper side of said base;
a first horizontal support arm, having a first end removably secured to said vertical support arm;
a pair of first washers and a pair of first securement fasteners, each disposed on said first horizontal support arm on either side of said vertical support arm;
a second horizontal support arm, having a first end removably secured to said vertical support arm;
a pair of second washers and a pair of second securement fasteners, each disposed on said second horizontal support arm on either side of said vertical support arm;
a first plurality of spool sleeves, each disposed on and capable of traversing along said first horizontal support arm;
a plurality of first pairs of flanged friction fittings bracketing an individual one of said first plurality of spool sleeves, each first pair of flanged friction fittings capable of traversing along said first horizontal support arm;
a first compression spring disposed on said first horizontal support arm between said vertical support arm and a flanged friction fitting from said first pair of flanged friction fittings most adjacent to said vertical support arm;
a first locking collar removably secured to said first horizontal support arm;
a second plurality of spool sleeves, each disposed on and capable of traversing along said second horizontal support arm;
a plurality of second pairs of flanged friction fittings bracketing an individual one of said second plurality of spool sleeves, each second pair of flanged friction fittings capable of traversing along said second horizontal support arm;
a second compression spring disposed on said second horizontal support arm between said vertical support arm and a flanged friction fitting from said second pair of flanged friction fittings most adjacent to said vertical support arm; and,
a second locking collar removably secured to said secured horizontal support arm;
wherein said first and second horizontal support arms are disposed parallel to each other;
wherein each of said first plurality of spool sleeves and each of said plurality of second support sleeves is capable of supporting a fishing line spool reel thereupon;
wherein each of said first plurality of spool sleeves and each of said plurality of first pairs of flanged friction fittings are capable of free rotation about said first horizontal support arm;
wherein said first locking collar provides a restrictive force against rotation of and said first compression spring provides continuous tension to each fishing line spool reel when installed on said first horizontal support arm;
wherein each of said second plurality of spool sleeves and each of said plurality of second pairs of flanged friction fittings are capable of free rotation about said second horizontal support arm; and,
wherein said second locking collar provides a restrictive force against rotation of and said second compression spring provides continuous tension to each fishing line spool reel when installed on said second horizontal support arm.

13. The device of claim 12, wherein said base is fabricated with steel channel stock.

14. The device of claim 12, wherein said vertical support arm is fabricated out of steel strap stock.

15. The device of claim 12, wherein said first and second horizontal support arms are fabricated out of steel rods.

16. The device of claim 12, wherein said first horizontal support arm and said second horizontal support arm are each configured to support up to four fishing line spool reels thereupon.

17. The device of claim 12, wherein:
   at least a portion of said first horizontal support arm protrudes through said vertical support arm; and,
   at least a portion of said second horizontal support arm protrudes through said vertical support arm.

18. The device of claim 12, further comprising an anti-corrosion and water-proof finish.

\* \* \* \* \*